United States Patent
Elazary et al.

(10) Patent No.: US 10,466,713 B2
(45) Date of Patent: Nov. 5, 2019

(54) ROBOTIC NAVIGATION AND MAPPING

(71) Applicant: INVIA ROBOTICS, INC., Agoura Hills, CA (US)

(72) Inventors: Lior Elazary, Agoura Hills, CA (US); Randolph Charles Voorhies, Culver City, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 103 days.

(21) Appl. No.: 15/911,996

(22) Filed: Mar. 5, 2018

(65) Prior Publication Data

US 2019/0171220 A1    Jun. 6, 2019

Related U.S. Application Data

(63) Continuation of application No. 15/017,223, filed on Feb. 5, 2016, now Pat. No. 9,908,702.

(51) Int. Cl.
| | |
|---|---|
| *G06F 7/00* | (2006.01) |
| *G05D 1/02* | (2006.01) |
| *B65G 1/137* | (2006.01) |

(52) U.S. Cl.
CPC ......... *G05D 1/0234* (2013.01); *B65G 1/1375* (2013.01); *B65G 2203/041* (2013.01); *G05D 2201/0216* (2013.01); *Y10S 901/01* (2013.01)

(58) Field of Classification Search
None
See application file for complete search history.

(56) References Cited

U.S. PATENT DOCUMENTS

| | | | |
|---|---|---|---|
| 9,378,484 B1 * | 6/2016 | Russell | G06Q 10/0875 |
| 9,505,554 B1 | 11/2016 | Kong et al. | |
| 9,908,702 B2 * | 3/2018 | Elazary | G05D 1/0234 |
| 2013/0310694 A1 | 11/2013 | Tsujita et al. | |
| 2016/0340122 A1 | 11/2016 | Lindblom | |
| 2016/0378088 A1 * | 12/2016 | Son | G06K 17/00 235/385 |
| 2017/0183157 A9 | 6/2017 | Massey | |

* cited by examiner

*Primary Examiner* — Yolanda R Cumbess
(74) *Attorney, Agent, or Firm* — Ansari Katiraei LLP; Arman Katiraei; Sadiq Ansari

(57) ABSTRACT

Some embodiments efficiently locate and map item locations in a distribution site using robots and a set of markers that the robots can scan without cessation of movement. Some embodiments optimally position a robot for item retrieval or placement. The optimal position is determined by affine transform computation or feature mapping. The robot first aligns itself according to the expected item position as indicated by one or more of the markers. The alignment is determined based on size and orientation of the markers in images obtained using the robot's camera. The robot then aligns itself according to the actual item position. Here, the repositioning is determined based on size and orientation of the actual item in images obtained using the robot's camera. Using the robot cameras and feature mapping, robots can traverse the shelves to identify and map item location therein.

20 Claims, 10 Drawing Sheets

ROBOTIC NAVIGATION AND MAPPING

CLAIM OF BENEFIT TO RELATED APPLICATIONS

This application is a continuation of U.S. nonprovisional application Ser. No. 15/017,223 entitled "Robotic Navigation and Mapping", filed Feb. 5, 2016. The contents of application Ser. No. 15/017,223 are hereby incorporated by reference.

BACKGROUND INFORMATION

Robots are fully or partially autonomous machines for assisting or replacing humans in various tasks. As robot complexity increases through improved hardware and software, robots are able to perform more and more tasks with or in place of humans.

One of the biggest robotic challenges is enabling robots to navigate within a confined area. Sensory arrays including cameras, accelerometers, global positioning system (GPS) receives, depth of field imagery, lasers, and other sensors allow robots to detect. In order to navigate, a robot must be able to translate what it detects into a location and plot a path from its location to an intended destination through available routes while avoiding various obstacles along the path.

Robots can be programmed with maps to facilitate such navigation. The maps identify available routes within a specific area. Using the sensory array and various identifiers positioned throughout the mapped area, the robot can determine its location in relation to a map and then plot a desired course to a destination while avoiding obstacles en route.

Certain tasks require robots to have greater navigational granularity. Item retrieval is one such task. Inventory retrieval robots retrieve specific items from various shelves positioned throughout a warehouse or distribution site. These robots must not only navigate to a specific shelf within the warehouse where a desired item is positioned, but must also be able to navigate the shelf in order to locate the desired item's specific location within the shelf so that the item can be properly retrieved. The difficulty of this robotic task increases when the shelf contains many different items of different sizes and shapes, the shelf is at least two dimensional comprising different rows at different heights onto which the different items are placed, and the robot can be tasked to retrieve any of the arbitrary sized and shaped items therefrom.

A simplistic approach involves statically programming the robot with item locations and item shapes and sizes. Robots programmed with static item locations know exactly where to find each individual item on a shelf. Thus, the robot uses a map to first navigate to the shelf containing the desired item. Once the robot reaches a desired shelf, it then moves to the exact item location about the shelf via the programmed static item location. The robot then uses the statically programmed item shape and size to determine the best way to retrieve the item.

This simplistic approach has several shortcomings. There is extensive administrative overhead. Each item location must be individually programmed along with the size and shape of the item. Once programmed, the item locations must remain fixed and unchanged. Any item placement change requires robot reprogramming. Moreover, the changes cannot be made while the robots are operational. Otherwise, the robots could retrieve the wrong item. This makes it difficult to change or replace inventory as new items are introduced or existing items are phased out.

Having fixed locations also makes it difficult to optimize the warehouse. The robots cannot dynamically shift popular items closer to one another or closer to the warehouse packaging stations or shipping ports to reduce the time it takes for the robots to retrieve such popular items, because the robots expect to find the items at a fixed location. Another shortcoming for robots navigating based on static item locations, sizes, and shapes is the inability of the robots to account for item position deviation. As one robot retrieves one item, the position of items adjacent to or behind the retrieved item may shift. Consequently, when another robot attempts to retrieve one of the adjacent or behind items, it may be unable to retrieve the item or it may retrieve the item off-balance increasing the possibility that the item will be dropped during retrieval.

Accordingly, there is a need for new and improved robot navigation and mapping. There is a need for navigation that is not based on statically programmed locations, sizes, and shapes, but rather one that allows for the realities of an ever-changing distribution site. There is further a need to ensure that any such navigation is performed continuously and without delays associated with stopping and analyzing each and every item that comes before a robot. To fully move away from static mappings, there is further a need for the robots to be able to identify items in the distribution site, map their locations, and notify one another of the positions.

BRIEF DESCRIPTION OF THE DRAWINGS

A preferred embodiment for robotic navigation and mapping will now be described, by way of example only, with reference to the accompanying drawings in which.

DETAILED DESCRIPTION OF PREFERRED EMBODIMENTS

Figure 1:
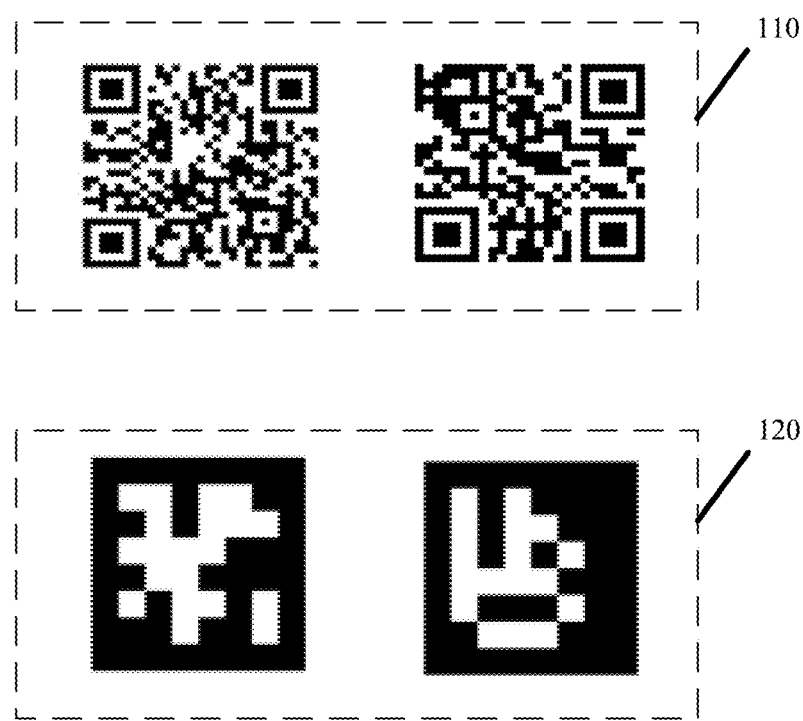
FIG. 1 presents an exemplary subset of high resolution markers and subset of low resolution markers facilitating robotic navigation in accordance with some embodiments.

In the following detailed description, numerous details, examples, and embodiments are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which robotic navigation and mapping can be practiced. It is to be understood that other embodiments can be used and structural changes can be made without departing from the scope of the embodiments herein described.

The embodiments disclose systems and methods for robotic navigation and mapping. The systems and methods apply to robots. In particular, robots that retrieve and place items about shelves, containers, or other platforms throughout a distribution site, such as a warehouse. Such robots are used for autonomous order fulfillment and optimization of the distribution site. The embodiments can be adapted and applied to robots operating in other environments and performing other tasks and are not restricted to inventory retrieval or management robots. Examples of some robots that can be used as part of the systems and methods described herein are provided in U.S. Pat. No. 9,120,622, the contents of which are herein incorporated by reference.

The systems and methods enhance robot functionality by enabling the robots to navigate to the location of an item anywhere within a distribution site efficiently, precisely, and in a continuous and uninterrupted manner. The navigation is facilitated in part by a set of encoded markers and improved robotic detection and recognition thereof. In particular, the enhanced robot functionality allows the robots to leverage the encoded markers in navigating to an item location without having to temporarily pause the navigation when scanning and decoding location information from the encoded markers. The enhanced robot functionality further leverages the markers for proper positioning of a robot before an item in three dimensional space in order to improve robotic retrieval of items. In this case, the robot leverages the markers to quickly and precisely align distance and orientation of the robot to the expected item location as indicated by one or more markers. The enhanced robot functionality provided herein further employs sensors from the robot's sensory array to correct for any deviations between an expected and actual item location, thereby repositioning the robot to ensure a centered and balanced retrieval of an item with the sensors further verifying retrieval of a correct item.

The improved marker detection and recognition also enables dynamic item mapping within the distribution site. Robots can place items anywhere within the distribution site (i.e., restock) and rearrange item locations. The remapped positions are then communicated using the markers to other robots in real-time such that other robots can be dynamically updated as to item positioning throughout the distribution site. By way of the dynamic item mapping, the robots can manage inventory while also optimizing the distribution site for efficient retrieval of popular items.

Each marker of the set of encoded markers is formed by an arrangement of patterns, lines, shapes, and other symbols or visual identifiers. Each marker provides a point of reference. In some embodiments, each marker also encodes information that upon decoding conveys more than a point of reference. The encoded information can identify a nearby object, a location, a measure, size, and cost as some examples.

In some embodiments, the markers are fiducials of varying resolutions. High resolution fiducials, such as barcodes and Quick Response (QR) codes, comprise a more tightly condensed set of visual information than low resolution fiducials, such as April tags or April codes. Other fiducials that can be used as robotic navigational markers include ArUco markers and ARTag markers as some examples. The navigational and mapping techniques described herein are generally applicable to any marker of similar shape or form.

High resolution markers provide a larger alphabet than low resolution markers. In other words, more unique markers can be produced using the high resolution markers than the low resolution markers. A large alphabet is useful for identifying more points of reference with greater granularity than lower resolution markers. A large alphabet can therefore be advantageous in establishing a sufficient number of points of reference in a large warehouse or in identifying a large quantity of distinct items within a warehouse. High resolution markers can also be encoded with more complex or a greater amount of information than low resolution markers.

The problem with high resolution markers is the high degree of fidelity that is needed to accurately read and decode such markers. Not only does a robot need a high resolution camera or scanner and software algorithms to read and decode a high resolution marker, the robot's cameras, scanners, and algorithms require time to identify the marker outline, focus on the marker, image or scan the marker, and then decode the signaling or messaging from the image. Movement while taking the image or scan can cause the fine detail in the condensed marker arrangement to be lost, thereby rendering the marker indecipherable. Moreover, the further the robot is from a high resolution marker, the more difficulty the robot's cameras or scanners have in resolving the condensed details of the high resolution marker. For these reasons, a robot navigating based on high resolution markers, such as barcodes or QR codes, must remain in close proximity to the markers and come to several stops in order to extract the encoded information from each marker in its path.

Accordingly, some embodiments provide methodologies for continuous robotic navigation based on low resolution markers. The robots of some embodiments are able to decipher low resolution markers in less time, with less visual accuracy, and from greater distances than high resolution markers. As a result, the robots are able to scan and decipher the markers without halting or otherwise interrupting their movement. In other words, the embodiments facilitate continuous robot movement from a start location to an end location based on information the robot obtains from scanning and deciphering low resolution markers interspersed between the start location and the end location.

For large warehouses in which the smaller alphabet of the low resolution markers is insufficient to reference the large quantity of unique items or unique item locations within the warehouse, some embodiments implement robotic navigation based on a dictionary created from combinations of two or more of the low resolution fiducials. This creates a larger alphabet without losing the lower fidelity, more distant, and continuous scanning and deciphering of the low resolution markers. Some embodiments further supplement robot navigation by using a mix of markers having differing resolutions. To maintain continuity in robot movement in some such embodiments, the high resolution markers can be disposed at natural transition points in the robot's movements (e.g., when the robot stops movement in one direction to turn or otherwise move in another direction or plane) or at points where the robot can retain focus on a high resolution marker for a greater length of time (e.g., when the robot comes to a stop before an item).

FIG. 1 presents an exemplary subset of high resolution markers 110 and subset of low resolution markers 120 facilitating robotic navigation in accordance with some embodiments. As evident, the features of the low resolution markers 120 are more easily discernable than the features of the high resolution markers 110. This is primarily due to the fewer number of features and larger size of each feature in the low resolution markers 120. The larger size of the low resolution marker features also allows the robots to correct for any blurriness that enters into an image or scan of a low resolution marker via software without affecting the decoding thereof. Consequently, the robots can take less precise images of the low resolution markers 120, wherein the lower precision can be due to the robot being transitory or further away from the marker while taking the image.

In some embodiments, no change is needed to the robot's sensory array in adapting robot navigation between the high resolution markers and the low resolution markers. The same set of cameras that are part of the robot's sensory array can be used to scan or image high resolution markers and low resolution markers alike. Although the sensory array does not change, the method with which the robots scan and decipher the different resolution markers may change. In some embodiments, the robots adjust their speed of movement and positioning to ensure accurate imaging and deciphering of the different resolution markers.

Figure 2:
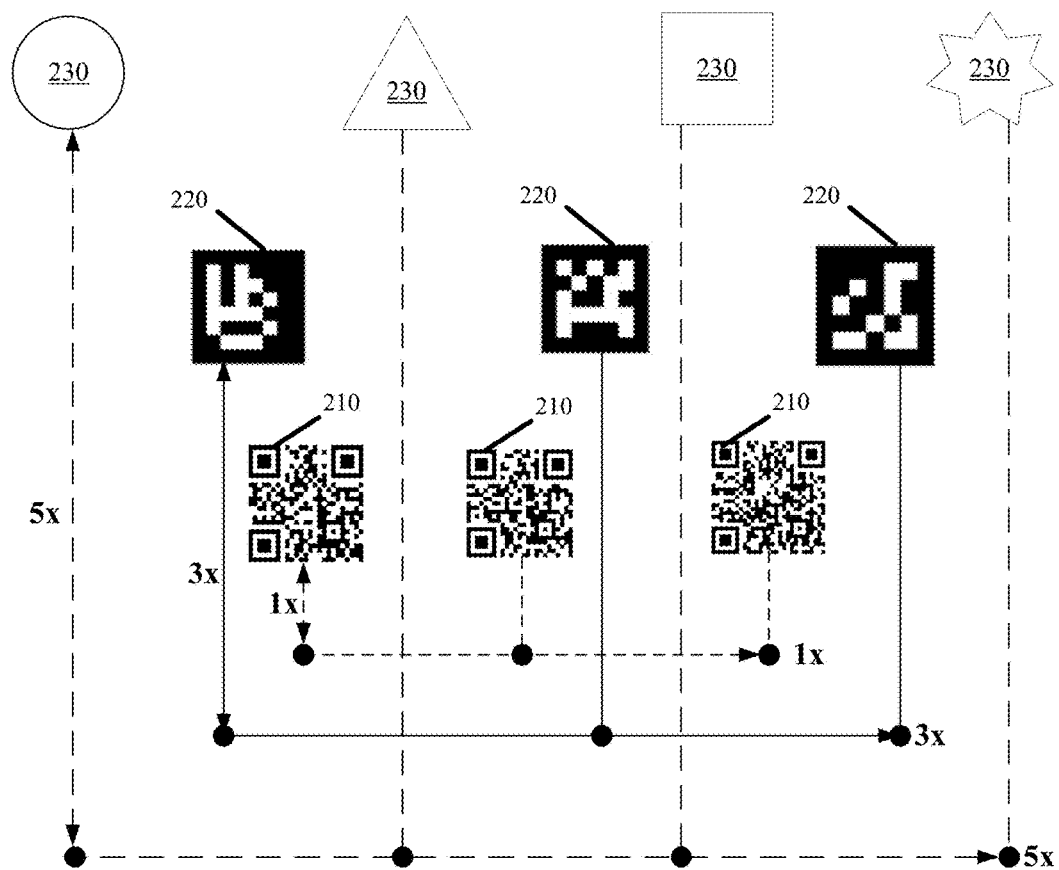
FIG. 2 conceptually illustrates adapting robot movement and positioning for scanning and deciphering markers of differing resolutions in accordance with some embodiments.

FIG. 2 conceptually illustrates adapting robot movement and positioning for scanning and deciphering markers of differing resolutions in accordance with some embodiments. The figure illustrates a first set of high resolution markers 210, a second set of medium resolution markers 220, and a third set of low resolution markers 230.

The low resolution markers 230 are the most easily discernable markers. Accordingly, a robot can decipher even a very poor image of the low resolution markers. The medium resolution markers 220 require more imaging or scanning accuracy than the low resolution markers 230 in order for the robots to decipher the medium resolution markers 220. The high resolution markers 210 require the most imaging or scanning accuracy in order for the robots to decipher the high resolution markers.

Accordingly, as shown in FIG. 2, when navigating using the low resolution markers 230, the robots can be more distant and travel at higher speeds than when navigating using the medium resolution markers 220. Similarly, when navigating using the high resolution markers 210, the robots are closer and travel at slower speeds than when navigating using the medium resolution markers 220.

To facilitate navigation by all three of the low, medium, and high resolution markers at different times, the differing resolution markers can be placed at different vertical planes. Accordingly, a robot can navigate using the low resolution markers 230 by moving or directing its camera to a first vertical plane, navigate using the medium resolution markers 220 by moving or directing its camera to a different second vertical plane, and navigate using the high resolution markers 210 by moving or directing is camera to a different third vertical plane.

Some embodiments employ this method of navigation to allow robots to move at high speeds using the low resolution markers 230 in order to traverse long distances where a simple point of reference provided by the low resolution markers 230 suffices, to move at slower speeds using the medium resolution markers 220 when attempting to identify a position of an item about several items located on a shelf, and to move at even slower speeds using the high resolution markers 210 when fine tuning the positioning of the robot to properly retrieve an item from a shelf. An alternative navigational model using markers of different resolution is described below with reference to FIG. 5.

As noted above, some embodiments overcome the smaller alphabet of low resolution markers by creating a dictionary from combinations of two or more of the low resolution markers. In other words, the robots decode encoded signals or messages from two, three, or four just positioned markers rather than one single marker.

Figure 3:
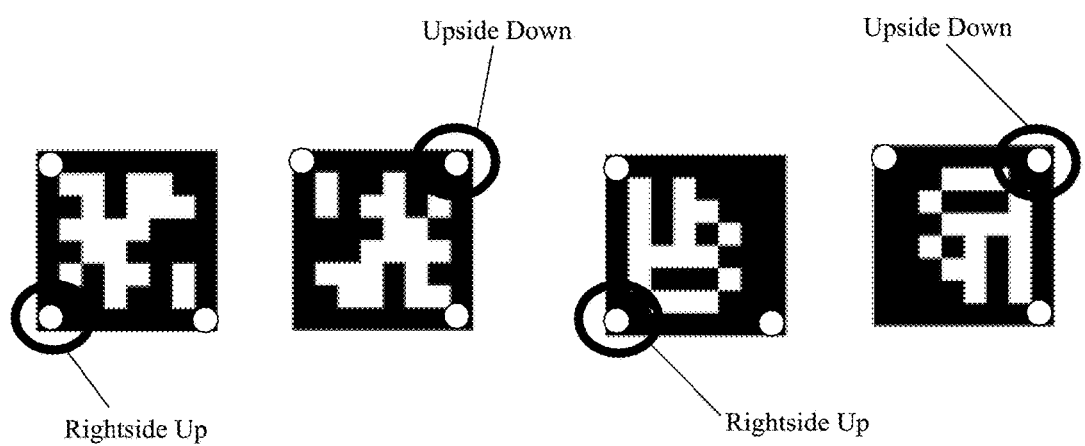
FIG. 3 illustrates adding circular identifiers to low resolution markers to assist in the orientation detection.

To aid in the robot's detection of such multi-marker formed messages, the expanded dictionary can be defined using alternating marker orientation. For example, the markers can alternate rightside up and upside down as one example for forming multi-marker formed messages for robotic navigation in accordance with some embodiments. In this case, two adjacent markers form an encoded message or signal. Specialized identifiers can be introduced within the markers to assist in the orientation detection. FIG. 3 illustrates adding circular identifiers to low resolution markers to assist in the orientation detection.

Figure 4:
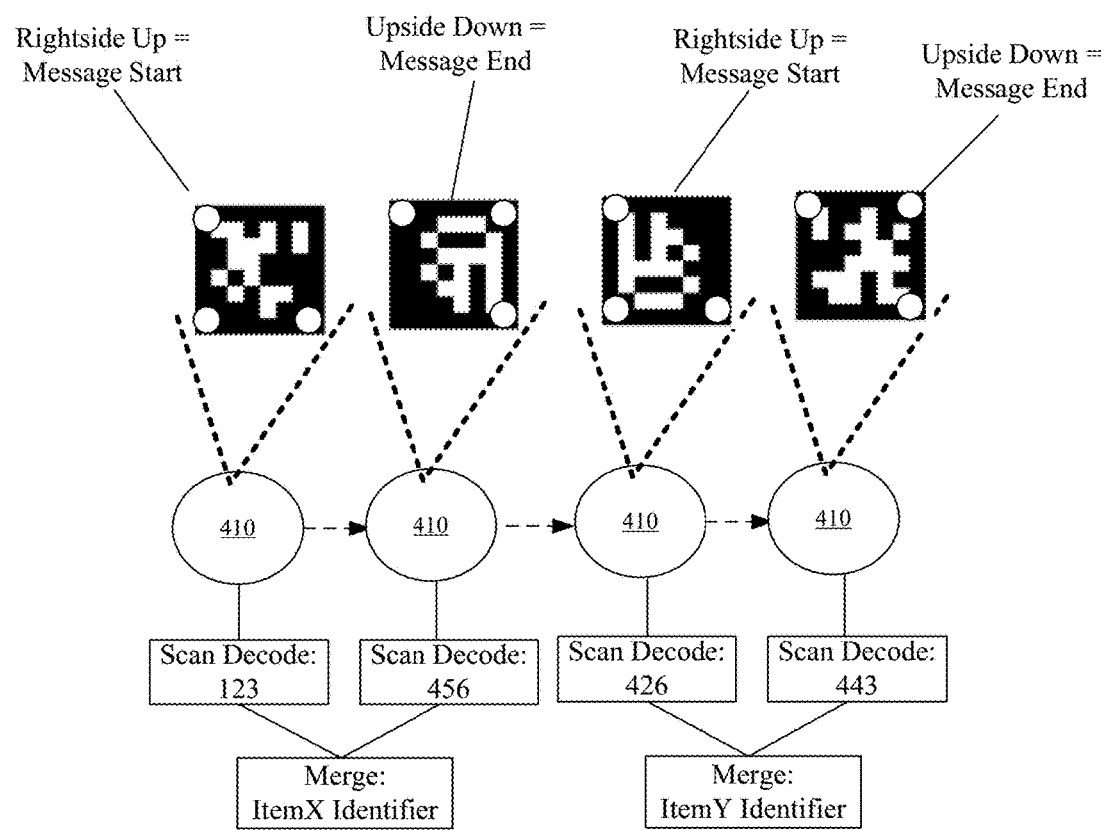
FIG. 4 illustrates a robot continuously scanning a series of markers as it navigates and decodes a multi-marker formed message in accordance with some embodiments.

When navigating using the alternating marker orientation, a robot at any time can identify a new multi-marker formed message by detecting the rightside up marker of the message. As shown in FIG. 4, a robot 410 continuously scans a series of markers as it navigates and decodes a message by first identifying a rightside up marker and decoding that marker with an adjacent upside down marker. The robot 410 then merges the information it obtains or decodes from two adjacent markers in order generate one combined message containing navigational or identifying information for the robot.

Additional orientation shifts (e.g., 90 degree shifts) can be used to encode signaling or messaging in three or four adjacent markers. Some embodiments employ other techniques to increase the low resolution marker alphabet including using a code or count within the markers to identify which marker is the first in a multi-marker formed message.

In addition to or instead of the orientation shifts described above, other techniques can be used to differentiate multi-marker formed messages from one another. Different coloring or reversing contrast can be used to designate first and last markers of multi-marker formed messages. In some embodiments, the different coloring and contrasts are used to expand the low resolution marker alphabet, whereby coloring or contrast enters into the decoding of a marker by providing a value or variable that is part of the information decoded from the marker.

Individual markers or marker combinations can be encoded with any information, signaling, or messaging that aide the robots in navigation. The markers can encode mapping information, coordinates, identifiers, item identification information, etc.

In preferred embodiments, the markers are positioned about a common spatial plane across the distribution site. This allows the robots to have a common point of reference when navigating within the distribution site. For example, after rising to retrieve a first item from a shelf, the robot can lower its camera back to the level of the common spatial plane. This aligns the robot camera with the markers such that the robot can resume scanning the markers to reorient itself before proceeding to the next shelf or destination.

Figure 5:
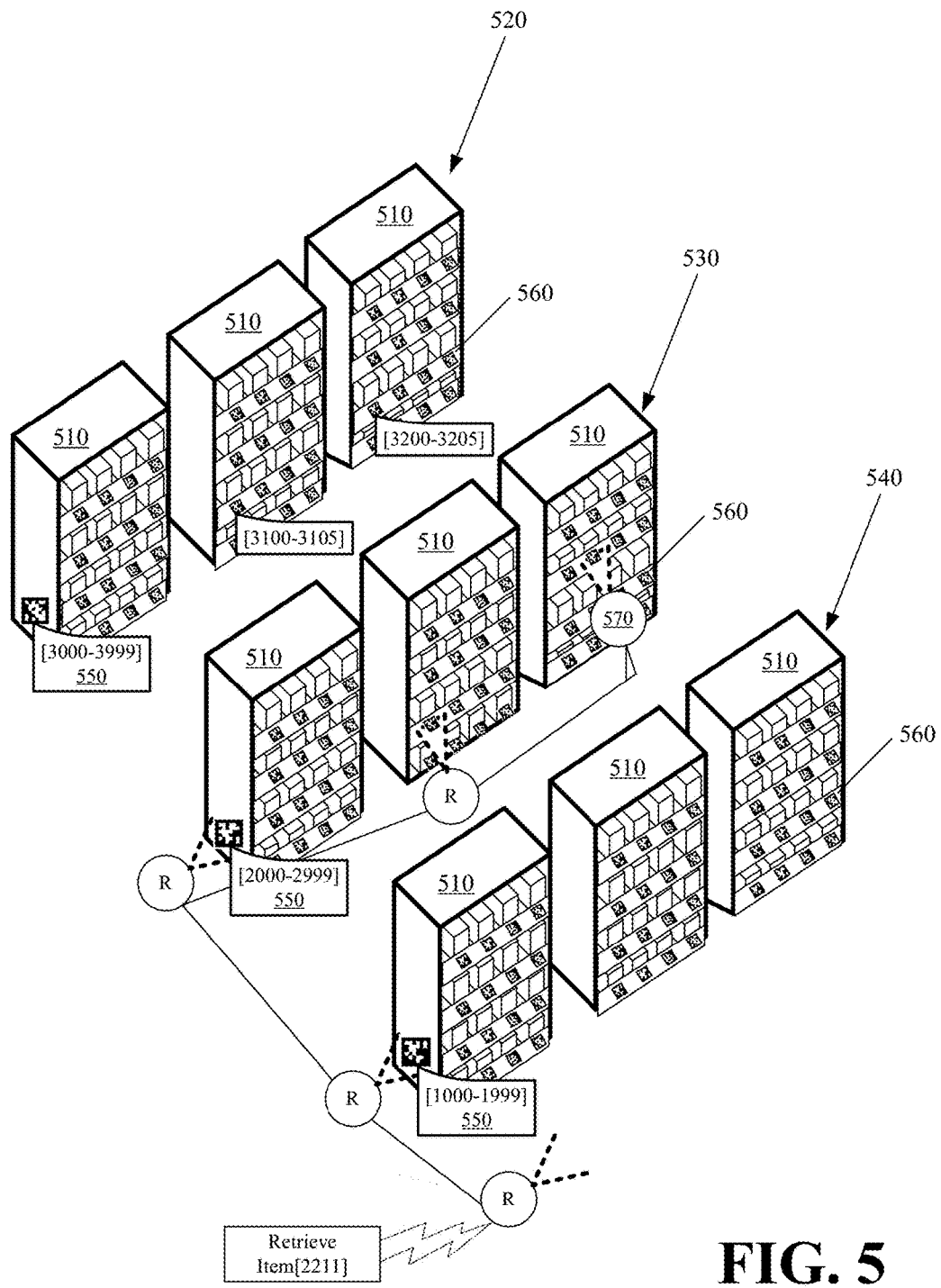
FIG. 5 illustrates robot navigation within a distribution site using the markers in accordance with some embodiments.

FIG. 5 illustrates robot navigation within a distribution site using the markers in accordance with some embodiments. FIG. 5 can be illustrative of robotic navigation using markers or varying resolution (e.g., high resolution markers and low resolution markers) or robotic navigation using only low resolution markers.

Within the distribution site are several shelves 510 arranged into a set of aisles 520, 530, and 540. At the end of each aisle 520-540 is a first set of markers 550. As conceptually illustrated, the first set of markers 550 encode a different thousands value in increasing order. In some embodiments, the first set markers 550 can be high resolution markers. The end of aisle location for high resolution markers is ideal because such markers may need to encode a large quantity of information, each aisle could be a natural transition point in the robot's movements, and the robot can spend additional time scanning and deciphering each marker of the first set of markers 550 because of the large distance between the markers. Nevertheless, a robot may have to pause its movement in order to properly scan and decipher such high resolution markers. The delay can be minimized by reducing the number of markers from the first set of markers 550 the robot scans. For instance, from scanning a single marker from the first set of markers 550, the robot can determine the number of aisles in the distribution site, its current position, and the direction and distance to travel to reach a desired second aisle. The robot avoids scanning other markers for any aisle in between the first aisle and the second aisle. Upon arriving at the second aisle, the robot scans a second marker from the first set of markers 550 to confirm it has arrived at the correct aisle before changing direction and proceeding down the aisle. In some other embodiments, the first set of markers 550 are low resolution markers that the robot can continuously scan in order to identify a desired aisle from the aisles 520-540 without halting its movement as the robot traverses past each aisle.

A second set of markers 560 are positioned across the shelves of each aisle along a common spatial plane. As conceptually illustrated, the second set of markers 560 encode different values within the thousands value of the corresponding aisle in increasing order. If the number of unique points of reference from the aisles 520-540 exceed the low resolution marker alphabet, then each marker of the second set of markers 560 can be formed from a combination of two or more low resolution markers of differing orientation as described above with reference to FIG. 4.

In FIG. 5, the robot is sent a particular value from which it is to retrieve an item. By scanning the first set of markers 550, the robot can recognize which aisle contains the item. Upon identifying the correct aisle, the robot then continually scans the second set of markers 560 across the shelves of the aisle to arrive at the location of the item 570. The robot then retrieves the item and returns it to a designated location.

In FIG. 5, the markers encode values that directly map to different locations. In some embodiments, the markers indirectly identify item locations. In some such embodiments, the markers create a coordinate frame upon which items can be placed anywhere in three dimensions. A robot is provided a set of coordinates at which to find a specific item. The robot decodes spatial information (i.e., coordinates) from the markers during navigation in order to arrive at the identified coordinates designating the item location.

It is important to note that in some embodiments the markers do not provide a static mapping to item locations. If an item location changes, the robot is sent the updated coordinates or values identifying the updated location. The robot then finds its way to the updated location by scanning and decoding markers along the path to the updated location irrespective of what item is placed at the updated location at any given time.

This dynamic mapping allows the robots to manage and optimize the distribution site. When a robot moves an item from a position or coordinates identified by a first marker to a position or coordinates identified by a second marker, the robot reports the move to an inventory management server. The server then updates its mapping and identifies the updated coordinates or position when subsequently instructing robots to retrieve the item.

Since the locations of items are more likely to change than the shelf locations, another navigational methodology involves programming the robots with the locations of the shelves within the distribution site. This provides the robots a static map of the distribution site. The robots use the map to navigate to the desired shelf containing the desired item. The robots can then use the low resolution markers positioned about the shelf face to pinpoint the location of the desired item on the shelf before extracting the item from the shelf.

Thus far, the disclosure related to robotic navigation to an item location. Retrieving the item is a complicated task in-and-of itself. As was noted above, part of the improved robotic detection and recognition involves using the markers for proper positioning of a robot before an item in three dimensional space in order to improve robotic retrieval of the item.

Figure 6:
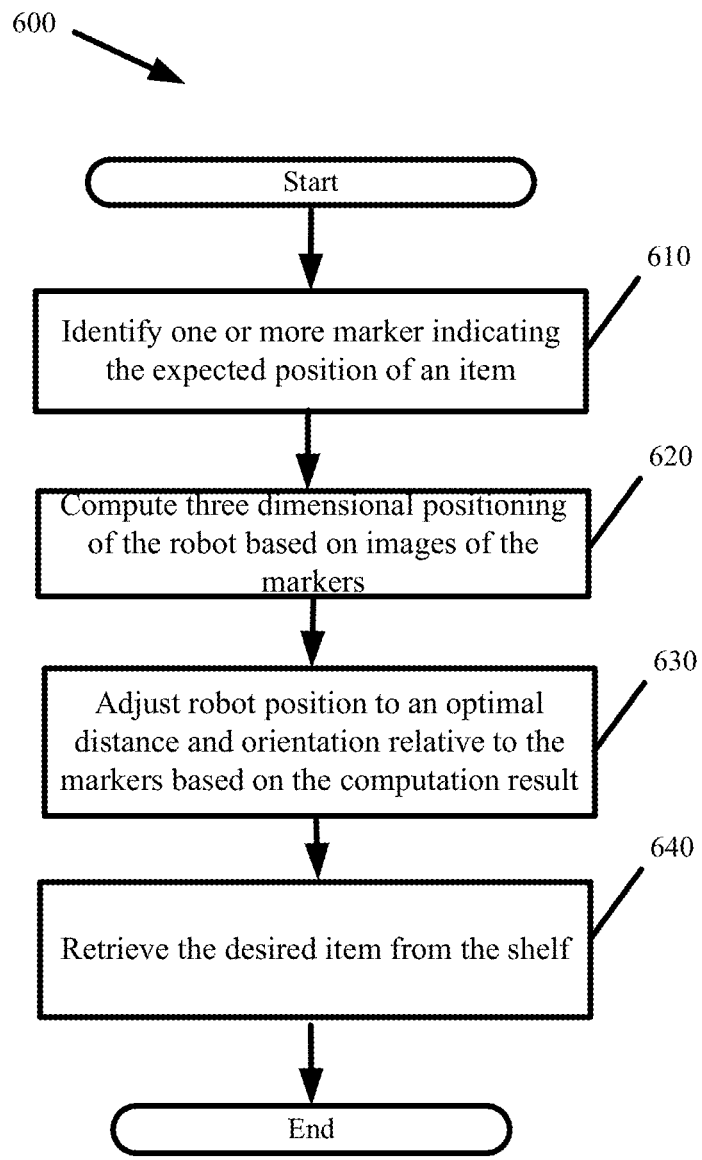
FIG. 6 presents a process with which a robot in accordance with some embodiments aligns its position in three-dimensional space based on a marker.

In some embodiments, the position of the robot within a three-dimensional space can be determined directly from one or more markers before or adjacent to the robot. FIG. 6 presents a process 600 with which a robot in accordance with some embodiments aligns its position in three-dimensional space based on a marker.

The process 600 begins with the robot identifying (at 610) and navigating the one or more markers that identify the expected position of an item to be retrieved by the robot. The identification is performed using one or more of the robot's cameras. From a first position at which the one or more markers fall within the cameras field of sight, the robot computes (at 620) its three dimensional position, including its distance and orientation, relative to the markers. In particular, the computation at step 620 determines the distance and orientation of the robot based on the size of the markers appearing in the robot's camera relative to a predefined size and its orientation relative to an amount of distortion in the appearance of the markers. In some embodiments, the robot via an internal processor computes a perspective transform, affine transform, or homography (or projective) transform using the scanned image of the markers at the robot first position.

The robot then adjusts (at 630) its position based on the distance and orientation information determined from the computation. The robot adjusts its position to an optimal distance and orientation relative to the markers. In adjusting its position, the process may continually scan the markers, perform the computation at step 620 for each scan, and make additional granular positional adjustments until arriving at the optimal positioning. In some embodiments, the optimal robot position is one in which the robot is centered and directly facing the one or more specialized markers identifying the item to be retrieved. The optimal position also involves a particular distance at which the robot should be relative to the markers. The optimal distance ensures that the robot does not crash into the shelf before retrieving the item. The optimal distance further ensures that the robot (or an item retrieval platform or deck of the robot) is not too far from the shelf such that the robot can reach and reach an item from the shelf.

As an alternative to the computation at step 620 and the positional adjustments made based on the computation result, the robot may compare a reference image to the image the robot takes of the marker or item before the robot. The robot can then detect differences between the size and orientation of the markers or item in the robot's image and the reference image and determine positional adjustments that would align the marker or item in the robot's camera so as to appear at the same size and orientation as the marker or item in the reference image.

Figure 7:
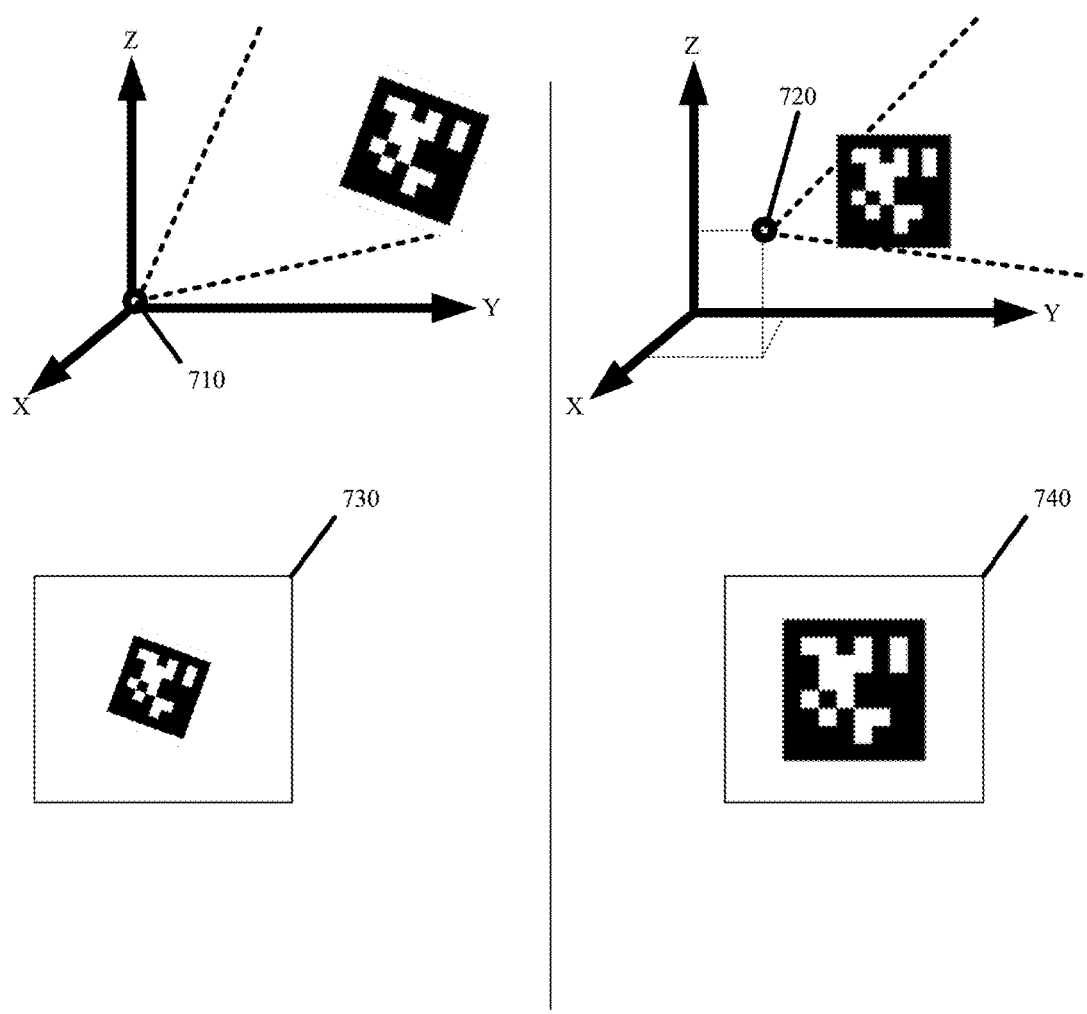
FIG. 7 conceptually illustrates the robot adjusting its position relative to a marker.

FIG. 7 conceptually illustrates the robot adjusting its position relative to a marker. The figure depicts a first position 710 and an adjusted second position 720 of the robot. The appearance of the marker in the robot's camera is also depicted at each position by reference pointer 730 for position 710 and reference pointer 740 for position 720. As shown, the marker appears small and slightly angled when at the first position 710. The robot obtains a snapshot of the marker at the first position 710 and computes the perspective transform to determine the positional adjustments needed to arrive at the second position 720. In this instance, the computation alerts the robot 710 that its distance is too far and its orientation is off-center. It should be noted that the positional adjustments determined from the computation are three dimensional. In other words, the robot adjusts its x, y, and z axial positioning relative to the item's x, y, and z axial positioning.

With reference back to FIG. 6, the robot retrieves (at 640) the desired item once at the optimal position. In some embodiments, retrieval involves additional steps to account for shifting of the item from its expected position. Such steps are described in further detail below.

Since items are of different sizes, an item's width can be specified using one or more markers, wherein the markers set the item boundaries. For example, a first marker encodes coordinates where one end of the item is expected to be found and a second marker encodes coordinates where the other end of the item is expected to be found. The robot can then center itself between the first and second markers for item retrieval. To do so, the robot computes the perspective transform for each of the first fiducial and the second fiducial and determines the positional adjustments on the results of both.

Process 700 orients the robot to an expected item location indicated by the markers. Items can however shift, move, or rotate as they or neighboring items are placed or removed from the shelf. To improve robotic retrieval of items and account for such movements, some embodiments use the robot's sensory array to refine the robot position relative to the item's actual location. These adjustments reduce the likelihood of retrieving an item off-center or off-balanced. The sensory array is further used to verify that the correct item is at the designated location.

Figure 8:
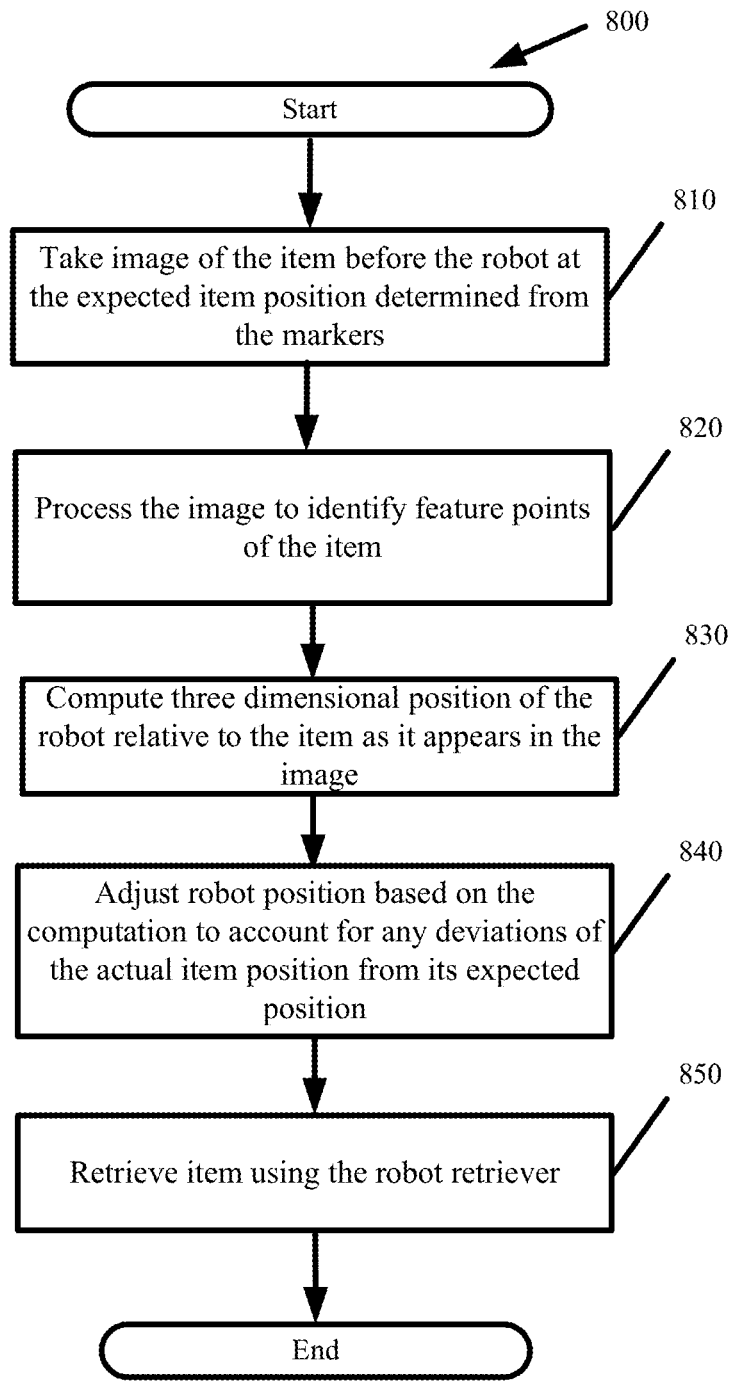
FIG. 8 presents a process for correcting the robot's position to account for deviations that shift an item from an expected location to an actual location in accordance with some embodiments.

In some embodiments, a camera coupled to the robot retriever is used to determine what granular adjustments are needed to shift the robot or robot retriever's position from an expected item position to the item's actual position, wherein the retriever is the robotic arm or mechanism with which the robot engages and retrieves the item from its actual position. FIG. 8 presents a process 800 for correcting the robot's position to account for deviations that shift an item from an expected location to an actual location in accordance with some embodiments.

Process 800 commences when the robot arrives at the expected item position indicated by one or more markers. Once at the expected position, the robot takes (at 810) an image of the item before the robot using one of the robot's camera. The robot processes (at 820) the image to identify feature points of the item. The robot uses the feature points to demarcate the item in the image. Identifying the feature points may include identifying the corners of the item, item shape, lettering, labels, packaging, coloring, unique identifiers such as a Universal Product Code (UPC), or any combination thereof. The robot computes (at 830) its three dimensional position, including its distance and orientation, relative to the item as it appears in the image. Here again, the computation may involve computing any of a perspective, affine, or homography transform.

Based on the computation, the robot granularly adjusts (at 840) its position to account for any deviations of the actual item position from its expected position and to optimally position the robot before the item. The positional adjustments include changing the orientation and distance of the robot relative to the actual item position. The optimal robot position is a position from which the robot retriever can achieve a centered and balanced retrieval of the item. The centered and balanced retrieval can differ for different items based on their proportions. For instance, the robot achieves a centered and balanced retrieval of a first item by engaging the front face of the first item, and achieves a centered and balanced retrieval of a second item by engaging the second item from atop. The granular adjustments to the robot's position can occur by repositioning the robot base and the robot as a whole. In other words, adjustments to the robot's position are made using the robot's wheels or legs. The granular adjustments to the robot's position can, alternatively or additionally, be made by moving the retriever (e.g., robotic arm or other retrieving mechanism). In some embodiments, the granular adjustments further involve raising or lowering the retriever to account for height, especially when items are stacked atop one another. As noted above, the granular adjustments to the robot's position are intended to place the robot at an optimal distance from the item. When the robot proceeds to retrieve the item, the optimal distance ensures that the robot retriever does not extend too short so as to not engage the item and does not extend too far so as to push the item away or damage the item.

Once at the optimal position, the robot retrieves (at 850) the item with the retriever. If the camera is located on the retriever, the robot can take additional images as the retriever moves and can recompute and adjust the position of the retriever to validate a centered and balanced retrieval of the item. Even if the camera is located off the retriever, the robot can take additional images to ensure that the retriever engages the item correctly.

FIG. 8 can be adapted for item placement as well as for item retrieval. Robots that retrieve an item from a shelf or other location do so with the purpose of placing the item elsewhere. The robot may deposit the item on another shelf, cart, conveyor, tote, other robot, human, or even atop or adjacent to other items. To do so, the robot navigates to the destination before granularly adjusting its position in a similar manner as was described above with reference to process 800. The robot seeks a marker or other reference point from which it can orient its position relative to the designated drop-off location. For example, with respect to a conveyor, the robot will adjust its height so that the item is about parallel to the conveyer and then adjust its position in order to place the item in the middle of the conveyer. The height and center position of the conveyer can be designated with one or more markers or other points of reference. Similarly, in stacking items, the robot would localize its position relative to the item stack. The robot arrives at the stack and takes one or more images of the stack. The robot processes the image to identify feature points of the item stack including the height of the stack. The robot computes its three dimensional position, including its distance and orientation, relative to the stack as it appears in the image. The robot then granularly adjusts its position so that it may deposit a transported item atop the stack.

Feature mapping is an alternative or supplemental method with which a robot can granularly adjust its position relative to an item's actual position or a designated drop-off location. Here again, a camera about the retriever takes an image of the item before the robot. The robot compares various features from the taken image with matching features of a prior image of the item. Based on the feature comparison, the robot can determine the relative item position and orientation. The robot can then determine if the item has shifted or otherwise deviated from its expected position and if granular positional adjustments are needed to correct for any such deviations when retrieving the item. A comparison of the feature sizes from the taken image and the prior image also enable the robot to determine the robot's distance from the item. For instance, the prior image may be stored with metadata specifying a distance at which the image was taken. If the sizes of the features from the current image are smaller than those of the prior image, then the robot can compute how much further it is from the item than the distance associated with the prior image. Similarly, if the features of the current image appear lower in the image frame than the feature of the prior image, the robot can adjust its height to center the features.

Feature matching can also be used to verify that the item before the robot is the correct item the robot is tasked with retrieving. In other words, feature matching verifies that the item indicated by the marker before the robot is the actual item indicated by the marker. In some embodiments, the feature used to verify the item is one or more unique identifiers. The unique identifiers can include a UPC, product name, label, coloring, dimensions, shape, or any combination thereof. If the item verification is successful, the robot performs the item retrieval. Otherwise, the item is out of stock or has moved and an error is issued.

Since feature mapping can be computationally expensive, some embodiments employ a more lightweight perception based technique to verify the item being retrieved. As part of the perception based technique, the robot computes a likelihood parameter that an item at the expected location is the correct item. The robot computes the likelihood parameter based on the amount of deviation between the detected item location and the expected item location. If an item is present at the expected location identified by a marker, then there is a high likelihood that the item at that position is the desired item. Accordingly, the robot increases the likelihood parameter when there is insignificant or no deviation and decreases the parameter as the deviation increases. If an item is some distance away from the expected location identified by the marker, the likelihood of the detected item being the correct item decreases as the distance from the expected location grows. Accordingly, the robot decreases the likelihood parameter according to the detected item's distance from the expected location.

Next, the robot uses the likelihood parameter to modify the verification probability for determining whether the detected item is the correct item. The verification probability decreases relative to increasing values for the likelihood parameter. For instance, the robot verifies the detected item to a 50% probability when the detected item position deviates insignificantly from the expected item position identified by the marker, but verifies the detected item to an 80% probability when the detected item position deviates more from its expected position. By reducing the verification probability, the robot is able to determine if the detected item is the correct item faster and with less computational effort. The robot can use one or more means to verify the item.

In some embodiments, changing the verification probability alters how much the image of the item at the actual item location is matched to a prior image of the correct item. In some embodiments, changing the verification probability alters the number of features that the robot positively verifies when performing feature matching. For instance, the robot verifies the detected item to be the correct item by matching two features from a detected item image with two features from a previously verified image of the correct item when the detected item location deviates slightly from the expected item location, but matches four features from the detected item image with four features from the previously verified image of the correct item when the detected item location deviates more from the expected item location.

Some embodiments accelerate the feature matching and item verification operations using robot location information. Without the location information, features from an image taken by a robot are compared against a database that stores features for different cataloged or known items. This can be a costly operation in terms of time and computing resources when the database stores features of several thousand items. Some embodiments use the robot's location to reduce the number of comparisons. In particular, features from the robot's image are compared only against a subset of items with last known locations to be within some threshold distance from the robot's location. This requires the database to store item features along with approximate or expected item locations. When a robot attempts to verify or identify an item before it, the robot provides features or an image containing features of the item as well as its location to the database so that the database compares the features of unverified item against features of known items in the immediate area surrounding the robot's location.

Additional sensors or modalities can be used in conjunction with or instead of the robot's camera for navigation, item location identification, and item verification. In some embodiments, the robot sensory array includes lasers. The lasers can supplement or replace the cameras by detecting the outline of an item in order to quickly identify the actual item's location. The lasers can further supplement or replace the cameras by detecting shapes and sizes of the item at the actual location and compare them to those of the verified item. The lasers can further supplement or replace the cameras by detecting features including barcodes and other identifiers in order to determine if the item at the actual location is the correct item.

Thus far, the embodiments have been directed to item retrieval. Some embodiments adapt the above methodologies involving the markers and robot utilization thereof for automated robot mapping of items about a distribution site.

The mapping embodiments involve using the robots to identify and map where different items are located throughout a distribution site. Robots operating within the distribution site may routinely perform the mapping as certain inventory runs out, new inventory is brought in, and inventory is moved within the distribution site. In fact, the mapping can be extended to allow the robots to dynamically reposition items within the distribution site. The dynamic repositioning allows robots to autonomously remove items that are no longer being sold or to introduce new items into the distribution site. The dynamic repositioning further allows the robots to autonomously restock inventory as well as manage the inventory by maximizing shelf space or optimizing item retrieval by placing heavily demanded items closer to one another or closer to packaging or shipping locations of the distribution site, thereby reducing the distance the robots travel in order to retrieve those items.

The automated mapping performed by one or more robots uses the placement of the markers about the distribution site shelves in order to associate the different markers to different item locations. As noted above, the markers can be used to create a coordinate frame. One or more robots traverse the shelves within the distribution site. Upon reaching a shelf, a robot uses its sensory array in order to detect items that are located at the coordinates specified by the markers. The robot then associates a detected item with the coordinates or marker(s) at the corresponding item location and updates an item location mapping for the distribution site.

Figure 9:
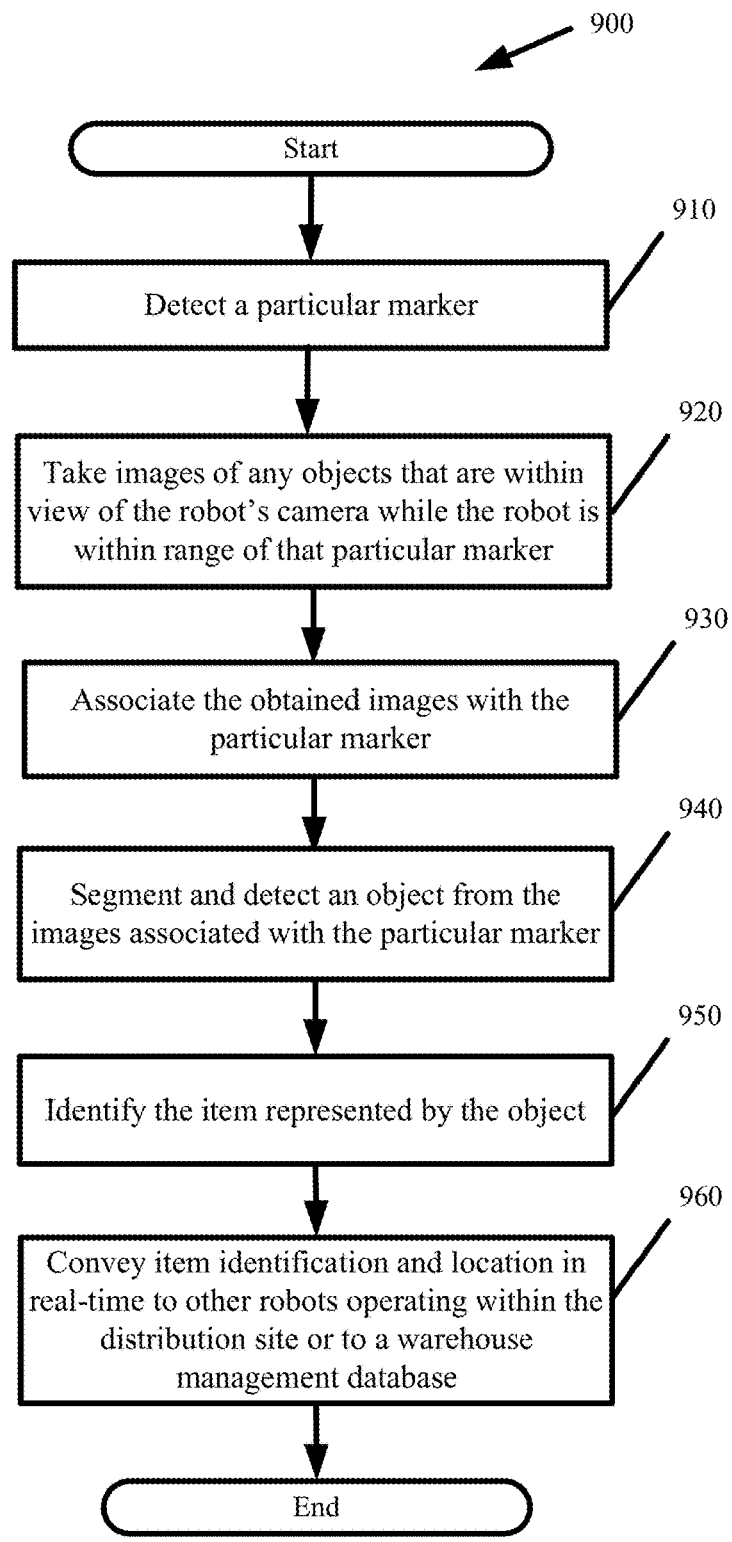
FIG. 9 presents a process for performing automated item mapping using a robot in accordance with some embodiments.

FIG. 9 presents a process 900 for performing automated item mapping using a robot in accordance with some embodiments. Process 900 is continually performed as the robot traverses the distribution site, moves from shelf to shelf, and moves from one shelf marker to the next until all or a specified set of markers are traversed. The process 900 commences once the robot detects (at 910) a particular marker during its traversal of the distribution site. The robot takes (at 920) one or more images of any objects that are within view of the robot's camera while the robot is within range of that particular marker. The robot associates (at 930) the obtained images with the particular marker or a decoded identifier (e.g., coordinates) obtained from the particular marker. In some embodiments, the robot continually takes images as it traverses the shelves and associates each image to a marker or coordinates decoded from one or more markers closest to the robot at the time the image was taken.

The robot analyzes the images and segments objects therein in order to detect (at 940) distinct objects therein. The segmentation can be performed by feature identification in which the robot identifies the outlines of an object or packaging based on different shapes, coloring, lettering, etc. of adjacent objects or based on sectional delimiters or dividers that may be part of the shelves and used to keep different items separate.

The robot then identifies (at 950) the item that is represented by the object or ignores the object if it does not correspond to any inventory items. The item identification can be performed by the robot scanning the detected object image for a barcode. If a barcode is discovered, the robot performs a database lookup to identify the segmented item at the corresponding location identified by one or more markers associated with the item. If no barcode is discovered, the robot can perform a feature matching technique to identify the item within the image or can alternatively pass the detected object image to an operator to manually specify the item identification.

To improve item identification and remove or render barcode detection optional, some embodiments perform item mapping via feature mapping. In some such embodiments, the robots are configured with a database providing a catalog of item images. Some embodiments supplement the database with Internet search capabilities. The robot compares features from the image of a detected item against features of items within the database. If a match is found, the descriptive item information is obtained from the database and mapped to the location identified by the markers associated with the item image.

Any identified item is then conveyed (at 960) in real-time to other robots operating within the distribution site or to an inventory management server. Wireless messaging can be used to send the item identification and location information. The inventory management server tracks inventory counts and item locations throughout the distribution site. The warehouse inventory management server also generates the item list that is passed to different robots for order fulfillment. For instance, when a customer order is received through a website or mobile application, the items of the customer order are parsed and searched against the inventory management server to obtain the coordinates or markers that identify the location of the items in the distribution site. The inventory management server then sends the list of coordinates or markers, and optionally images of the items, to one or more robots. The robots find the optimal path to the coordinates or markers in order to retrieve the customer order items from the corresponding locations.

Figure 10:
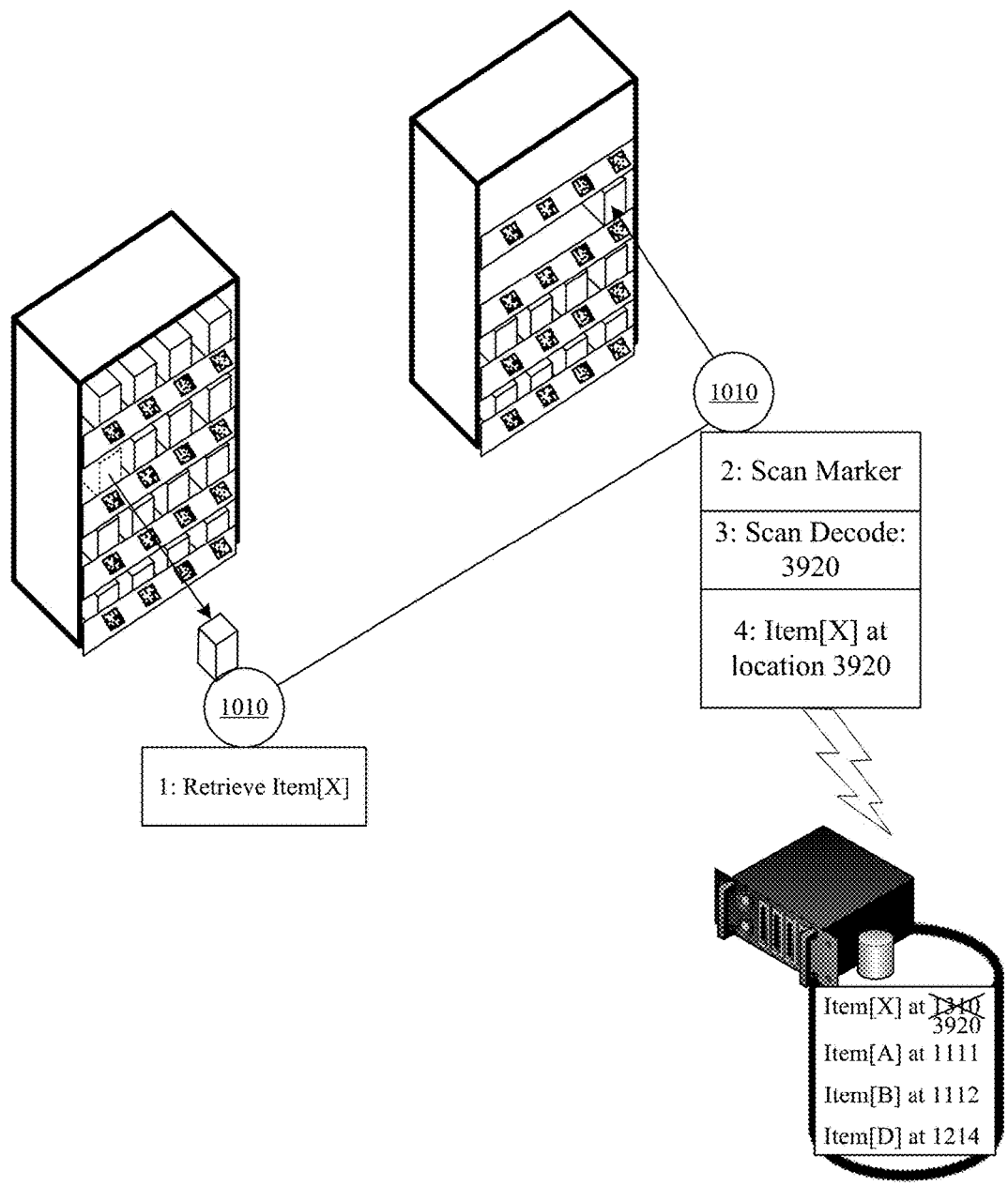
FIG. 10 conceptually illustrates a robot dynamically repositioning an item from a first location to a second location in accordance with some embodiments.

As noted above, the automated mapping further allows for dynamical item repositioning by the robots. FIG. 10 conceptually illustrates a robot 1010 dynamically repositioning an item from a first location to a second location in accordance with some embodiments.

The robot 1010 navigates to the first location based on an existing mapping that maps the item location to a first marker marking the first position. The robot 1010 uses the first marker to orient itself before the expected location of the item. The robot 1010 then readjusts its position to the actual item position before retrieving the item from the first location.

The robot 1010 then navigates to the second location as identified by a different second marker. The second marker can be passed to the robot 1010 as part of the instruction for dynamically repositioning the item. Alternatively, the robot 1010 may decide on its own to move the item when certain criteria are met. For instance, the robot 1010 may identify or be notified of the item being a high demand item that should be located with other high demand items. The robot can also identify on its own the second marker as an optimal location for the repositioning. The robot may have a map of markers that are currently not associated with any items and the robot may select the second marker based on certain selection criteria. Alternatively, the robot can traverse the distribution site upon coming across the second marker that is not associated with any item.

As shown in FIG. 10, the robot 1010 moves the item to the second marker, decodes the second marker identifying the new position, links the item identifier to the second marker identifying the new position, places the item at the open position associated with the second marker, and updates a database of the inventory management server or other robots of the updated position of the item. The inventory management server then updates its own internal mapping such that subsequent retrieval instructions for that same item point to the second marker instead of the first marker. In this manner, the robots can dynamically map and reorder items within a distribution site, thereby managing and optimizing inventory therein.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for robotic navigation, the method comprising:

scanning a plurality of markers with a sensor of a robot as the robot moves by the plurality of markers;

detecting based on said scanning by the robot at a first position, a first marker of the plurality of markers;

detecting based on said scanning by the robot at a second position near the first position, a second marker of the plurality of markers;

formulating a message from different data decoded from a combination of at least the first marker and the second marker; and modifying an operation of the robot based on the message.

2. The method of claim 1, wherein the first marker comprises a start message indicator and the second marker comprises an end message indicator, and wherein said formulating starts in response to the start message indicator of the first marker and ends in response to the end message indicator of the second marker.

3. The method of claim 2 further comprising detecting the start message indicator of the first marker based on a first orientation, coloring, or contrast of the first marker, and detecting the end message indicator of the second marker based on a second orientation, coloring, or contrast of the second marker that is different than the first orientation, coloring, or contrast of the first marker.

4. The method of claim 1, wherein said modifying comprises changing navigational direction of the robot in response to the message.

5. The method of claim 1, wherein said modifying comprises stopping the robot adjacent to the first and second markers, and retrieving an item from a structure about which the plurality of markers are physically distributed.

6. The method of claim 1, wherein the first marker is separated from the second marker by at least a third marker of the plurality of markers, and wherein said formulating comprises decoding different data from the first marker, the third marker, and the second marker in order, and deriving the message from decoding the different data from the first, third, and second markers in order.

7. The method of claim 1, wherein each marker of the plurality of markers represents a different value of a common alphabet, and wherein the message is defined with at least two of the values of the alphabet.

8. A method for robotic navigation, the method comprising:

moving a robot to a first position before an object;

scanning with a sensor of the robot, at least one particular marker on or adjacent to the object;

determining, based on said scanning, a size, orientation, or elevation of the particular marker, as captured by said sensor of the robot at the first position, that deviates from an expected size, orientation, or elevation; and repositioning the robot from the first position to a different second position at which the size, orientation, or elevation of the particular marker in subsequent scans of the sensor aligns with the expected size, orientation, or elevation.

9. The method of claim 8 further comprising retrieving the object in response to repositioning the robot at the second position and the size, orientation, or elevation of the particular marker in subsequent scans of the sensor aligning with the expected size, orientation, or elevation.

10. The method of claim 8 further comprising determining a distance and angle of the robot at the first position to the object based on the orientation and the size of the object from said scanning.

11. The method of claim 8, wherein said sensor is a camera, and wherein said scanning comprises obtaining an image of the at least one particular marker with the camera and with the robot at the first position.

12. The method of claim 8, wherein said repositioning comprises activating at least one motor controlling the movement of the robot to cover a direction and distance at which the size or orientation of the particular marker in subsequent scans of the sensor aligns with the expected size or the expected orientation.

13. The method of claim 8, wherein said repositioning further comprises raising or lowering the robot to a height at which the elevation of the particular marker in subsequent scans of the sensor aligns with the expected elevation.

14. The method of claim 8 further comprising scanning at least one feature of the object with the sensor of the robot and with the robot at the second position.

15. The method of claim 14 further comprising repositioning the robot from the second position to a different third position in response to a size, orientation, or elevation of the at least one feature of the object with the robot at the second position deviating from an expected size, orientation, or elevation of the feature in said scanning, and the size, orientation, or elevation of the at least one feature at the third position aligns with the expected size, orientation, or elevation of the feature in subsequent scanning with the robot at the third position.

16. A method for robotic inventory management, the method comprising:

navigating a robot to a first marker within an object warehouse based on an object mapping indicating a first location of a particular object adjacent to the first marker, the object warehouse storing a plurality of objects;

scanning the first marker with a sensor of the robot upon the robot navigating to the first location;

retrieving the particular object with said robot in response to said scanning the first marker;

identifying from said object mapping, a second marker indicating an open second location within the object warehouse;

returning the particular object to said second location with said robot;

scanning with the sensor of the robot, the second marker at the second location to which the particular object is returned; and updating the object mapping by changing a storage location of the particular object from the first marker to the second marker.

17. The method of claim 16, wherein said identifying comprises detecting an update to the object mapping by a different second robot scanning the second marker in response to retrieving an object from the second location.

18. The method of claim 16, wherein said updating comprising notifying at least one other robot operating in the object warehouse that the storage location of the particular object has changed from the first marker to the second marker.

19. The method of claim 16 further comprising delivering the particular object with the robot to a destination in said object warehouse after said retrieving.

20. The method of claim 19 further comprising selecting the open second location based on the second location having closer proximity to the destination than the first location.

* * * * *